United States Patent [19]

Mehta

[11] Patent Number: 5,148,722
[45] Date of Patent: Sep. 22, 1992

[54] METHOD FOR INVOKING A SHUTDOWN ON DEFAULT

[75] Inventor: Hemang S. Mehta, Sterling Heights, Mich.

[73] Assignee: Chrysler Corporation, Highland Park, Mich.

[21] Appl. No.: 568,816

[22] Filed: Aug. 17, 1990

[51] Int. Cl.⁵ .......................................... B60K 41/06
[52] U.S. Cl. ........................................................ 74/866
[58] Field of Search ............................................ 74/866

[56] References Cited

U.S. PATENT DOCUMENTS

| | | | |
|---|---|---|---|
| 4,495,457 | 1/1985 | Stahl | 74/866 X |
| 4,779,490 | 10/1988 | Milunas | 74/866 X |
| 4,823,644 | 4/1989 | Ohkumo | 74/866 |
| 4,875,391 | 10/1989 | Leising et al. | 74/866 |
| 4,922,425 | 5/1990 | Mack et al. | 74/866 X |
| 4,969,099 | 11/1990 | Iwatsuki et al. | 74/866 X |

Primary Examiner—Rodney H. Bonck
Assistant Examiner—Ryan W. Massey
Attorney, Agent, or Firm—Mark P. Calcaterra

[57] ABSTRACT

The present invention is a method for invoking a shutdown on default and allowing recovery from a partial default. The method includes the steps of defining temporary default gears to be allowed for operation of the transmission, monitoring predetermined variables of the transmission by the controller and determining whether a fault has been detected based on the monitored predetermined variables. The method also includes disconnecting electrical power from the transmission by the controller if a fault has been detected, and determining whether faultless operation of the transmission has occurred for a predetermined time period by the controller if a fault has not been detected. The method further includes allowing shifting between additional gears if faultless operation of the transmission has occurred for the predetermined time period.

6 Claims, 1 Drawing Sheet

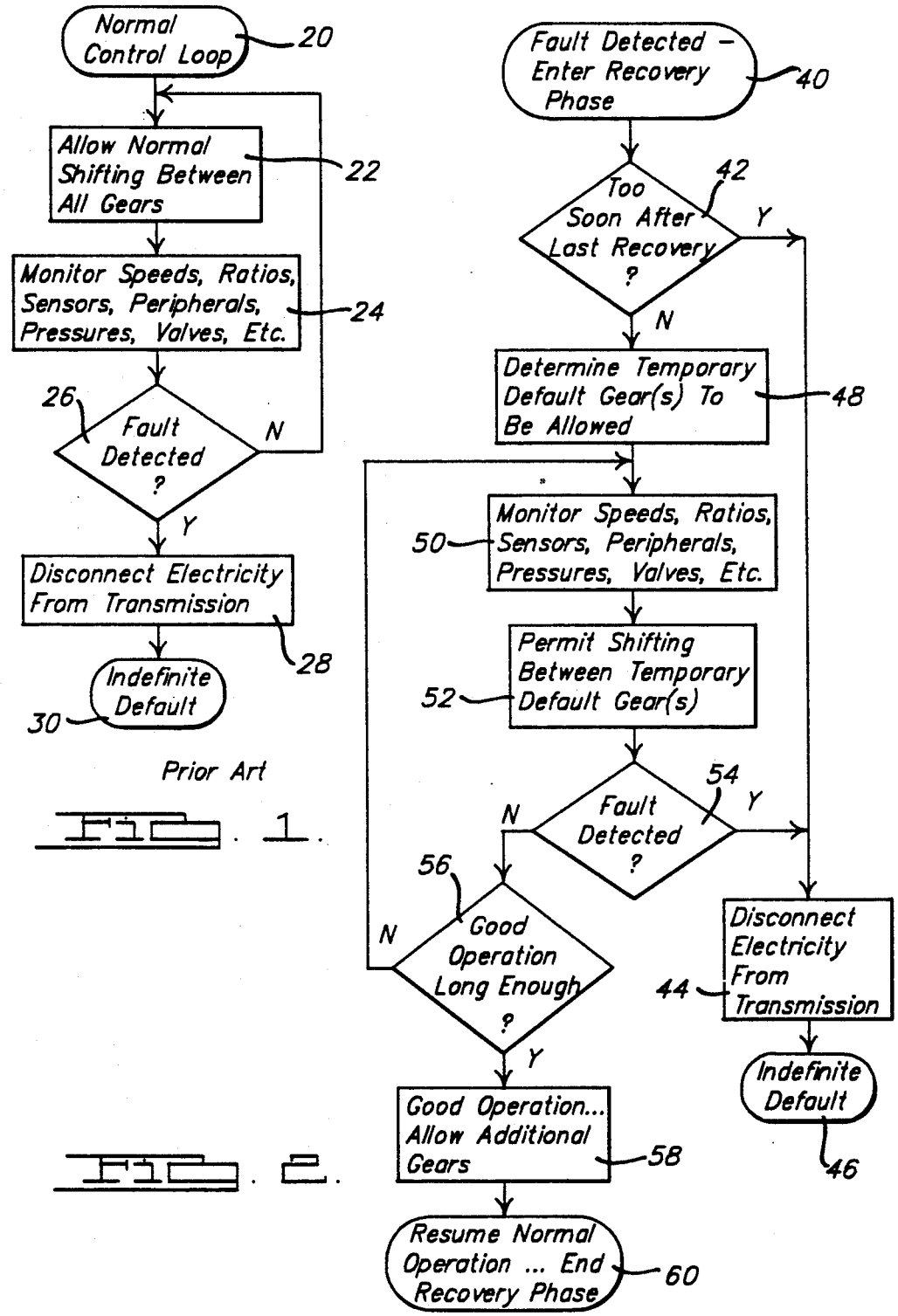

METHOD FOR INVOKING A SHUTDOWN ON DEFAULT

BACKGROUND OF THE INVENTION

1. Field of the Invention

The present invention relates generally to an automatic transmission primarily intended for motor vehicle use, and more particularly, to a method of invoking a shutdown on default of an electronic controller of an automatic transmission.

2. Description of Related Art

Automatic transmissions are designed to take automatic control of frictional units, gear ratio selection and gear shifting. In general, the major components featured in such an automatic transmission are: a torque converter; fluid pressure-operated multi-plate drive or brake clutches and/or brake bands which are connected to the individual elements of planetary gear sets in order to perform gear shifts; and transmission control such as valves for applying and releasing elements to shift the gears.

The control system of the automatic transmission is typically hydraulically operated through the use of several valves to direct and regulate the supply pressure. However, in recent years, a more advanced form of transmission control system has been proposed, which would offer the possibility of enabling the transmission to adapt itself to changing conditions. In this regard, U.S. Pat. No. 4,875,391, issued on Oct. 24, 1989, to Leising, et al., sets forth the fundamental development in this field. Specifically, this patent discloses an automatic transmission which features an "adaptive" control system that includes electrically operated solenoid-actuated valves which are controlled by an electronic controller. The controller shifts the transmission by applying a predetermined combination of valves which are under software control.

During operation of the transmission, the controller software monitors the transmission for proper operation by testing for: input and output speeds/ratios and engine speed; pressure checks/tests, e.g., presence of pressure only at the clutches that the controller has applied; and data from sensors and other peripherals. If a fault is detected by any of these tests for a sufficient length of time, the controller software will turn off a shutdown relay. By doing so, electrical power is cut off to the solenoid-actuated valves, thereby rendering the transmission in a "default" or "limp-in" mode.

One disadvantage of the above is that once the shutdown relay is turned off, the relay cannot be turned on unless the electronics of the controller are reset. The reset may be accomplished by turning the vehicle's ignition off and then back on. Until the reset is performed, the transmission is held in the limp-in mode indefinitely. This indefinite "default" is undesirable because the detected faulty operation may only be temporary and, regardless, may put the transmission in an indefinite default state; the operator of the vehicle may not know that the default occurred and may drive in the default mode for long periods in spite of a temporary fault; and/or unnecessary unrecoverable default operation of the transmission may compromise vehicle driveability, durability and fuel economy.

SUMMARY OF THE INVENTION

It is, therefore, one object of the present invention to eliminate an indefinite default state for an electronically-controlled automatic transmission.

It is another object of the present invention to provide a method of invoking a shutdown on default for a controller of an electronically-controlled automatic transmission.

It is a further object of the present invention to allow the transmission to recover from a partial default.

To achieve the foregoing objects, the present invention is a method for invoking a shutdown on default and allowing recovery from a partial default. The method includes the steps of defining temporary default gears to be allowed for operation of the transmission, monitoring predetermined variables of the transmission by the controller and determining whether a fault has been detected based on the monitored predetermined variables. The method also includes disconnecting electrical power from the transmission by the controller if a fault has been detected, and determining whether faultless operation of the transmission has occurred for a predetermined time period by the controller if a fault has not been detected. The method further includes allowing shifting between additional gears if faultless operation of the transmission has occurred for the predetermined time period.

One advantage of the present invention is that the transmission is allowed to recover from a partial default. Another advantage of the present invention is that the software can invoke a shutdown on default. A further advantage of the present invention is that an indefinite default state is eliminated, due to temporary malfunctions.

Other objects, features, and advantages of the present invention will become more fully apparent from the following description of the preferred embodiment, the appended claims and accompanying drawings.

BRIEF DESCRIPTION OF THE DRAWINGS

FIG. 1 is a flowchart of a prior art method of shutdown on default.

FIG. 2 is a flowchart of a method for invoking a software shutdown on default according to the present invention.

DESCRIPTION OF THE PREFERRED EMBODIMENT(S)

As described in U.S. Pat. No. 4,875,391, entitled "An Electronically-Controlled, Adaptive Automatic Transmission System", the disclosure of which is hereby incorporated by reference, a transmission control system includes an engine controller, a transmission controller and a Chrysler Collision Detection (CCD) serial data bus for allowing communication between the engine controller and transmission controller. A shutdown relay interconnects the transmission controller and a plurality of solenoid-actuated valves. For a complete description of the above transmission system, reference is made to the above-identified U.S. Pat. No. 4,875,391.

Referring to FIG. 1, a prior art shutdown on default methodology is shown. The methodology enters from the normal or main control loop through bubble 20. The methodology then advances to block 22 and allows normal shifting between all gears of the transmission. The methodology then advances to block 24 to monitor speeds, ratios, sensors, peripherals, pressures, valves, etc. by the transmission controller. The methodology advances to diamond 26 and determines whether a fault has been detected as a result of monitoring performed in block 24. If a fault has not been detected, the methodology branches back to block 22 and allows the normal shifting between all gears of the transmission. If a fault has been detected, the methodology advances to block 28 and disconnects the electrical power from the electronic transmission controller to the transmission. The methodology then advances to bubble 30 and the transmission remains in an indefinite default state. It should be appreciated that the electronic transmission controller turns off a shutdown relay which, in turn, cuts or turns off electrical power to the solenoid-actuated valves.

Referring to FIG. 2, a flowchart of the methodology for invoking a shutdown on default according to the present invention is shown. The methodology enters through bubble 40 after a fault is detected to enter a recovery phase. The methodology then advances to diamond 42 and determines whether it is too soon after the last recovery to recover from a default. If so, the methodology advances to block 44 and disconnects the electricity from the electronic transmission controller to the transmission. This is known as a "hard default". The methodology then advances to bubble 46 and remains in an indefinite or hard default.

In diamond 42, if it is not too soon after the last recovery, the methodology advances to block 48 and determines the temporary default gears to be allowed for operation of the transmission based on an analysis of speeds, ratios, gear failed in, severity of fault, etc., and limits operation to only these allowable gears. The methodology then advances to block 50 and monitors speeds, ratios, sensors, peripherals, pressures, valves, etc. The methodology then advances to block 52 and permits shifting of the transmission between temporary default gears. The methodology then advances to diamond 54 and determines whether a fault is detected. If a fault is detected, the methodology advances to block 44, previously described, to establish a hard default. If a fault has not been detected, the methodology advances to diamond 56 and determines whether there has been good or acceptable operation for a sufficient time period. In other words, the methodology determines whether faultless operation has been observed long enough or predetermined time period in each of the allowed gears. If not, the methodology branches to block 50 previously described. If there has been good or faultless operation for a long enough time period, the methodology advances to block 58 and determines that there has been good operation and allows additional gears to be used. The methodology then advances to bubble 60 and resumes normal operation and ends the recovery phase. Accordingly, the system has been allowed to recover from a partial default.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise then as specifically described.

What is claimed is:

1. In a transmission system including a transmission having a plurality of gears, a plurality of solenoid-operated valves for allowing shifting between the gears, and an electronic controller for controlling electrical power to the solenoid-actuated valves, a method of invoking a shutdown on default to disconnect power from the solenoid-actuated valves, said method comprising the steps of:
    defining temporary default gears to be allowed for operation of the transmission;
    monitoring predetermined variables of the transmission by the electronic controller;
    determining whether a fault has been detected based on the monitored predetermined variables;
    disconnecting electrical power to the solenoid-actuated valves by the electronic controller if a fault has been detected;
    determining whether faultless operation of the transmission has occurred for a predetermined time period by the electronic controller if a fault has not been detected; and
    allowing shifting between additional gears if faultless operation of the transmission has occurred for the predetermined time period.

2. A method as set forth in claim 1 including the step of determining whether a predetermined time period has elapsed before said step of monitoring after a fault has been detected.

3. A method as set forth in claim 2 including the step of disconnecting electrical power to the solenoid-actuated valves by the electronic controller if the predetermined time period has not elapsed.

4. A method as set forth in claim 1 including the step of shifting between temporary default gears.

5. In a transmission system including a transmission having a plurality of gears, a plurality of solenoid-operated valves for allowing shifting between the gears, and an electronic controller for controlling electrical power to the solenoid-actuated valves, a method of invoking a shutdown on default to disconnect power from the solenoid-actuated valves, said method comprising the steps of:
    defining temporary default gears to be allowed for operation of the transmission;
    monitoring predetermined variables of the transmission by the electronic controller;
    allowing shifting between temporary default gears;
    determining whether a fault has been detected based on the monitored predetermined variables;
    disconnecting electrical power to the solenoid-actuated valves by the electronic controller if a fault has been detected;
    determining whether faultless operation of the transmission has occurred for a predetermined time period by the electronic controller if a fault has not been detected; and
    allowing shifting between additional gears if faultless operation of the transmission has occurred for the predetermined time period.

6. In a transmission system including a transmission having a plurality of gears, a plurality of solenoid-operated valves for allowing shifting between the gears, and an electronic controller for controlling electrical power to the solenoid-actuated valves, a method of invoking a shutdown on default to disconnect power from the solenoid-actuated valves, said method comprising the steps of:

defining temporary default gears to be allowed for operation of the transmission;

monitoring predetermined variables of the transmission by the electronic controller;

allowing shifting between temporary default gears;

determining whether a fault has been detected based on the monitored predetermined variables;

disconnecting electrical power to the solenoid-actuated valves by the electronic controller if a fault has been detected;

determining whether faultless operation of the transmission has occurred for a first predetermined time period by the electronic controller if a fault has not been detected;

determining whether a second predetermined time period has elapsed before said step of monitoring after a fault has been detected;

disconnecting electrical power to the solenoid-actuated valves by the electronic controller if the second predetermined time period has not elapsed; and allowing shifting between additional gears if faultless operation of the transmission has occurred for the first predetermined time period.

* * * * *